United States Patent [19]

Yalpani

[11] Patent Number: 5,225,227
[45] Date of Patent: Jul. 6, 1993

[54] POLYHYDROXYALKANOATE FLAVOR DELIVERY SYSTEM

[76] Inventor: Manssur Yalpani, 2860 White Oak La., Buffalo Grove, Ill. 60089

[21] Appl. No.: 616,510

[22] Filed: Nov. 21, 1990

[51] Int. Cl.$^5$ .......................... A23G 9/00; A23L 1/22
[52] U.S. Cl. ..................................... 426/580; 426/531;
426/534; 426/565; 426/566; 426/72; 426/582;
426/583; 426/586; 426/589; 426/605
[58] Field of Search .............. 426/531, 601, 611, 804,
426/565, 566, 580, 582, 583, 586, 589, 605, 572,
534; 435/146

[56] References Cited
PUBLICATIONS

Ratledge, "Lipid Biotechnology: a wonderland for the microbial physiologist", JAOCS, vol. 64, No. 12, pp. 1647–1656. 1987 Abstract.

Primary Examiner—Joseph Golian
Assistant Examiner—Evan Federman
Attorney, Agent, or Firm—John M. Sanders

[57] ABSTRACT

Polyhydroxyalkanoates are combined with fat soluble flavors to provide a flavor delivery system for low-fat and no-fat foods. The polyhydroxyalkanoates preferably have a porous structure.

17 Claims, 3 Drawing Sheets

POLYHYDROXYALKANOATE FLAVOR DELIVERY SYSTEM

BACKGROUND OF THE INVENTION

The present invention relates to the use of polyhydroxyalkanoate compositions (PHA) as a flavor delivery system for low-fat and no-fat foods products. Additionally, the present invention relates to a method of delivering fat soluble flavors to low-fat and no-fat food products by combining PHAs with fat soluble flavor compounds and then adding the combination to the low-fat or no-fat food. The PHA/flavor composition provides release of fat soluble flavors similar to that of the traditional fat laden food counterparts. Additionally, the present invention relates to non-fat and low-fat food products which contain the present flavor delivery system.

Poly(hydroxyalkanoates) (PHAs) are well-known polyester compounds produced by a variety of microorganisms, such as bacteria and algae. A PHA polyester can include the same or different repeating units, depending upon the choice of carbon source substrates and fermentation conditions employed in the production of the PHA. One particular PHA including the same repeating units is poly(3-hydroxybutyric acid), or poly(3-hydroxybutyrate), termed PHB, and having the structural formula:

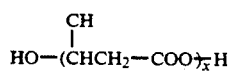

wherein x represents an integer of from 500 to about 17,000.

PHB is a natural storage product of bacteria and algae, and is present as discrete granules within the cell cytoplasmic space. However, unlike other, biologically-synthesized polymers such as proteins and polysaccharides, PHB is thermoplastic having a high degree of crystallinity and a well-defined melting point at about 180° C. But, PHB is unstable at its melting point and degrades, essentially quantitatively, to crotonic acid at a temperature slightly above its melting point. Accordingly, practical applications for this natural, biodegradable polyester have been limited. Therefore, investigators have studied other PHAs, such as the biodegradable copolyester poly(hydroxybutyrate-co-valerate), including both of the monomeric units 3-hydroxybutyrate and 3-hydroxyvalerate, in order to discover a PHA having sufficient thermal stability and other suitable chemical and physical properties for use in practical applications.

Generally, a PHA is synthesized by a microorganism. However, some PHA compounds have been synthesized chemically, such as by polymerization of racemic and optically-active butyrolactone or other suitable monomers. Such chemically-synthesized PHA polyesters exhibit a relatively low average molecular weight, and the synthesis is not economically viable. In general, the following publications provide background information for PHA polymers, both in regard to their synthesis and their properties:

1) E. A. Dawes, et al., *Adv. Microb. Physiol.*, 10, p. 135 (1973);

2) P. A. Holmes, "Developments in Crystalline Polymers-2", D. C. Basset, ed., Elsevier Applied Science, London, Chap. 1, pp. 1-65 (1988); and 3) P. A. Holmes, *Phys. Technol.*, 16, pp. 32-36 (1985).

The preparation, extraction and purification, of a PHA by a biosynthetic process is known. For example, Richardson in European Patent Application Serial No. 046,344, and Lafferty et al. in U.S. Pat. No. 4,786,598, disclose the preparation of poly-D-(−)-3-hydroxybutyric acid (PHB) by culturing the microorganism *Alcaligenes latus* or a mutant thereof. Walker et al., in U.S. Pat. No. 4,358,583, teach the extraction and purification of poly(3-hydroxybutyric acid) from the cells walls of PHB-producing microorganisms. Furthermore, the bacterial synthesis of various co-poly(hydroxyalkanoates), such as the copolymer of 3-hydroxybutyric acid and 3-hydroxypentanoic acid, is described in publications such as:

Y. Doi, et al., "Production of Copolyesters of 3-Hydroxybutyrate and 3-Hydroxyvalerate by Alcaligenes eutrophus from Butyric and Pentanoic Acids", *Appl. Microbiol. Biotechnol.*, 28, pp. 330-334 (1988);

Doi, U.S. Pat. No. 4,876,331;

P. Holmes, *Phys. Technol.*, 16, pp. 32-36 (1985);

M. Kunioka, et al., "Crystalline and Thermal Properties of Bacterial Copolyesters: Poly(3-Hydroxybutyrate-co-3-hydroxyvalerate) and Poly(3-Hydroxybutyrate-co-4-hydroxybutyrate)", *Macromolecules*, 22, pp. 694-697 (1989); and R. Gross, et al., "Biosynthesis and Characterization of Poly(s-Hydroxyalkanoates) Produced by Pseudomonas oleovorans", *Macromolecules*, 22, pp. 1106-1115 (1989).

The above-listed patents and publications are representative of the state of the art relating to PHAs. In general, the homopolymeric and copolymeric PHAs described in the above references are attempts to improve the physical and chemical properties of the PHA by altering the carbon source for the biological synthesis of the PHA, or are attempts to find a suitable microorganism to produce a sufficient amount of the desired PHA. In general, a poly(hydroxyalkanoate) has the general structural formula (I), wherein R is hydrogen or an alkyl group having 1-12 carbon atoms, and the term "x" is the number of repeating units. As illustrated in general structural formula (I), a PHA is a polyester having a hydroxy-terminated end and a carboxy-terminated end. The most widely-known and intensively-studied

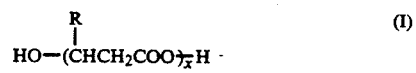

poly(hydroxyalkanoate) is the previously-described, biodegradable PHA known as poly(hydroxybutyrate), or PHB, wherein the R substituent in general structural formula (I) is methyl. However, PHAs having an R substituent of up to nine carbon atoms have been biosynthesized and studied, as have PHAs including 4-hydroxybutyrate [(—CH$_2$CH$_2$CH$_2$CO$_2$—)n] as a repeating unit.

In addition, copolymers of general structural formula (II) have been biosynthesized by the appropriate choice of carbon substrates. For example, the copolymer of general structural formula (II),

$$\text{HO}-(\text{CHCH}_2\text{COO})_b(\text{CHCH}_2\text{COO})_c-\text{H} \quad \text{(II)}$$

wherein b+c represent the number of repeating units (wherein b+c=500-17,000), R₄ is methyl and R₅ is ethyl, known as poly(hydroxybutyrate-co-valerate) or (P[HBcoHV)), has been biosynthesized and studied. In general, the copolyesters of general structural formula (II) wherein the substituents R₄ and R₅ independently, are hydrogen or an alkyl or alkenyl group including up to nine carbon atoms are known. Alkenyl-branched PHA's are described by K. Fritzsche, in "Production of Unsaturated Polyesters by *Pseudomonas oleovorans*", Int. J. Biol.Macromol., Vol. 12, pp. 85-91 (1990). In addition, a terpolymer of structural formula (III) has been biosynthesized by the bacterium *Rhodospirillum rubrum* from a carbon source including 3-hydroxybutyric acid, 3-hydroxypentanoic acid and 4-pentenoic acid.

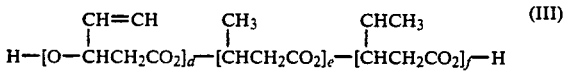

$$\text{H}-[\text{O}-\overset{\overset{\text{CH}=\text{CH}}{|}}{\text{CHCH}_2\text{CO}_2}]_d-[\overset{\overset{\text{CH}_3}{|}}{\text{CHCH}_2\text{CO}_2}]_e-[\overset{\overset{\text{CHCH}_3}{|}}{\text{CHCH}_2\text{CO}_2}]_f-\text{H} \quad \text{(III)}$$

Wherein d, e and f represent the number of repeating units and d+e+f=500-17,000. This terpolymer is described by R. Gross et al. in the publication, "The Biosynthesis and Characterization of New Poly(e-Hydroxyalkanoates)", in Polymer Preprints, 30(1), pp. 492-493 (1989).

The biologically-synthesized PHAs exhibit a molecular weight of up to about 1,500,000 daltons. These high molecular weight, biologically-synthesized PHAs can be degraded, or depolymerized, to yield a PHA having a molecular weight as low as about 3000 daltons. For example, Trathnigg et al., in Angew. Macromol. Chem., 161, p. 1-8 (1988), described the preparation of a low molecular weight PHB by a controlled acid hydrolysis of a high molecular weight, biologically-synthesized PHB using aqueous formic, acetic or butyric acid at an elevated temperature of 90°-100° C. Similarly, B. Heuttecoeur, et al., in *C.R. Hebd. Seances Acad. Sci.*, 274, pp. 2729-2732, (1972), describe the partial alkaline degradation of PHB, and S. Akita, et al., in *Macromolecules*, 9, pp. 774-780 (1976), describe the alcoholysis of PHB with methanol and p-toluenesulfonic acid. The methods of Trathnigg, et al and Heuttecoeur, et al provide a degraded PHB polymer with a carboxylic acid or a carboxylate terminal group, whereas the method of Akita provides an ester terminal group. Also see S. Coulombe, et al., "High-Pressure Liquid Chromatography for Fractionating Oligomers from Degraded Poly(β-Hydroxybutyrate)", *Macromolecules*, 11, pp. 279-280 (1978); and A. Ballistreri, et al., "Sequencing Bacterial Poly(β-Hydroxybutyrate-co-o-hydroxyvalerate) by Partial Methanolysis, High-Performance Liquid Chromatography Fractionation and Fast Atom Bombardment Mass Spectrometry Analysis", *Macromolecules*, 22, pp. 2107-2111 (1989).

H. Morikawa et al. in *Can. J. Chem.*, 59, pp. 2306-2313, (1981) demonstrated that thermal degradation of a PHA copolyester yields monomeric, oligomeric and polymeric PHAs with olefinic terminal groups. Morikawa et al. pyrolyzed PHB to yield crotonic acid and oligomers of PHB having a terminal crotonate moiety, as shown in the polyester of structural formula (IV) wherein k is from 500 to about 17,000. Therefore, pyrolysis of a PHA can provide an

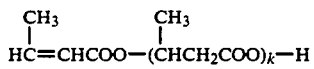

$$\text{HC}=\overset{\overset{\text{CH}_3}{|}}{\text{CHCOO}}-(\overset{\overset{\text{CH}_3}{|}}{\text{CHCH}_2\text{COO}})_k-\text{H} \quad \text{(IV)}$$

oligomer with a reactive vinyl terminal group as a site for further chemical modification of the degraded PHA.

Accordingly, from the above degradation methods, i.e. acidic hydrolysis, alkaline hydrolysis, alcoholysis or pyrolysis, a high molecular weight, biologically-synthesized PHA can be degraded to a relatively low molecular weight PHA that includes one of a variety of reactive terminal functionalities, including hydroxyl, free carboxylic acid, carboxylate, ester, and olefinic functionalities. These reactive terminal functionalities therefore allow the introduction of numerous other types of terminal functionalities onto the degraded PHA polyester.

In the past, interest in PHAs concentrated on their unique biodegradable and biocompatible properties, as well as their various physical properties that range from thermoplastic to elastomeric. The physical and chemical properties inherent to PRAs suggest a variet of applications, such as in controlled drug release systems, biomedical devices, specialty packaging materials, and numerous agricultural applications. However, while PHAs are of general interest because of their biodegradable nature, their actual use as a plastic material has been hampered by their thermal instability. For example, poly-3-hydroxybutyrate is thermoplastic, but also is thermally unstable at temperatures exceeding its melting point of about 180° C. N. Grassie, et al., in *Polym. Deqrad. Stabil.*, 6, pp. 47-61 (1984), disclose that a substantial molecular weight reduction of PHB occurs by heating PHB in the temperature range of 180°-200° C. The inherent thermal instability of PHB is partially overcome by incorporating a second monomer unit into the polyester. The melting point of a PHB can, for instance, be reduced to 75° C., as in (P[HBcoHV)) including about 40 mol % 3-hydroxyvalerate, resulting in a polymer that is thermally stable up to about 160° C. However, further enhancements in the thermal stability of PHAs are necessary for their practical use in commercial applications. Also see M. Kunioka, et al., *Macromolecules*, 23, pp. 1933-1936 (1990).

Accordingly, prior investigators have studied the chemical and biological synthesis of PHAs, and the degradation of PHAs, in attempts to provide a biodegradable polymer having physical and chemical properties suitable for consumer, industrial and agricultural applications. However, the prior investigators have studied essentially only homopolymeric and copolymeric hydroxyalkanoates. In general, to date, very few known references are directed to a compound, or its method of preparation, including a PHA polymer functionalized with a moiety other than a poly(hydroxyalkanoate).

Some investigators, like P. B. Dave et al., in "Survey of Polymer Blends Containing Poly(3-Hydroxybutyrate-co-16% Hydroxyvalerate", in *Polymer Preprints*, 31(1), pp. 442-443 (1990), studied the physical compatibility of a PHA blended with other commercial polymers. However, these were physical blends of a PHA with a second polymer, like a poly(ethylene oxide), and did not include a PHA polymer covalently attached to a molecule or a polymer other than a PHA. R. I. Hollingsworth et al. in Carbohydrate Research, 134, pp. C7-C11 (1984) and R. I. Hollingsworth et al. in *Journal of Bacteriology*, 169(7), pp. 3369-3371 (1987) found 3-hydroxybutyrate covalently attached as a noncarbohydrate substituent in the acidic capsular polysaccharide and extracellular polysaccharide of Rhizobium trifolii. However, the 3-hydroxybutyrate substituent was monomeric and was substituted biologically, not chemically. M. S. Reeve et al., in "The Chemical Degradation of Bacterial Polyesters for Use in the Preparation of New Degradable Block Copolymers", *Polymer Preprints*, 31(1), pp. 437-438 (1990), disclose a polyurethane-type copolymer derived from the reaction of 4,4,-diphenylmethane diisocyanate with polyethylene glycol and degraded PHB, and disclose a PHB-polystyrene block copolymer derived from degraded PHB and a polystyrene prepolymer including a carboxylic acid functionality.

SUMMARY OF THE INVENTION

Briefly, in accordance with the present invention, a flavor delivery composition is prepared by combining fat soluble flavor compositions with polyhyroxyalkanoates (PHA). The present flavor delivery compositions are added to low-fat and no-fat foods to provide the fat soluble flavoring to the food. The release of the fat soluble flavors is similar to that of high-fat content foods and provides the natural taste impression of conventional full-fat food products. The present flavor delivery compositions can be used to flavor low/no fat food products such as ice cream, yogurt, salad dressings, mayonnaise, cream, cream cheese, other cheeses, sour cream, sauces, icings, whipped toppings, frozen confections, dairy drinks and spreads.

Of particular interest, PHB and P(HBcoHV) are admixed with fat soluble flavors to form porous particles having a particle size distribution of from about 0.1-200 microns ($\mu$).

DETAILED DESCRIPTION OF THE INVENTION

Figure 1:
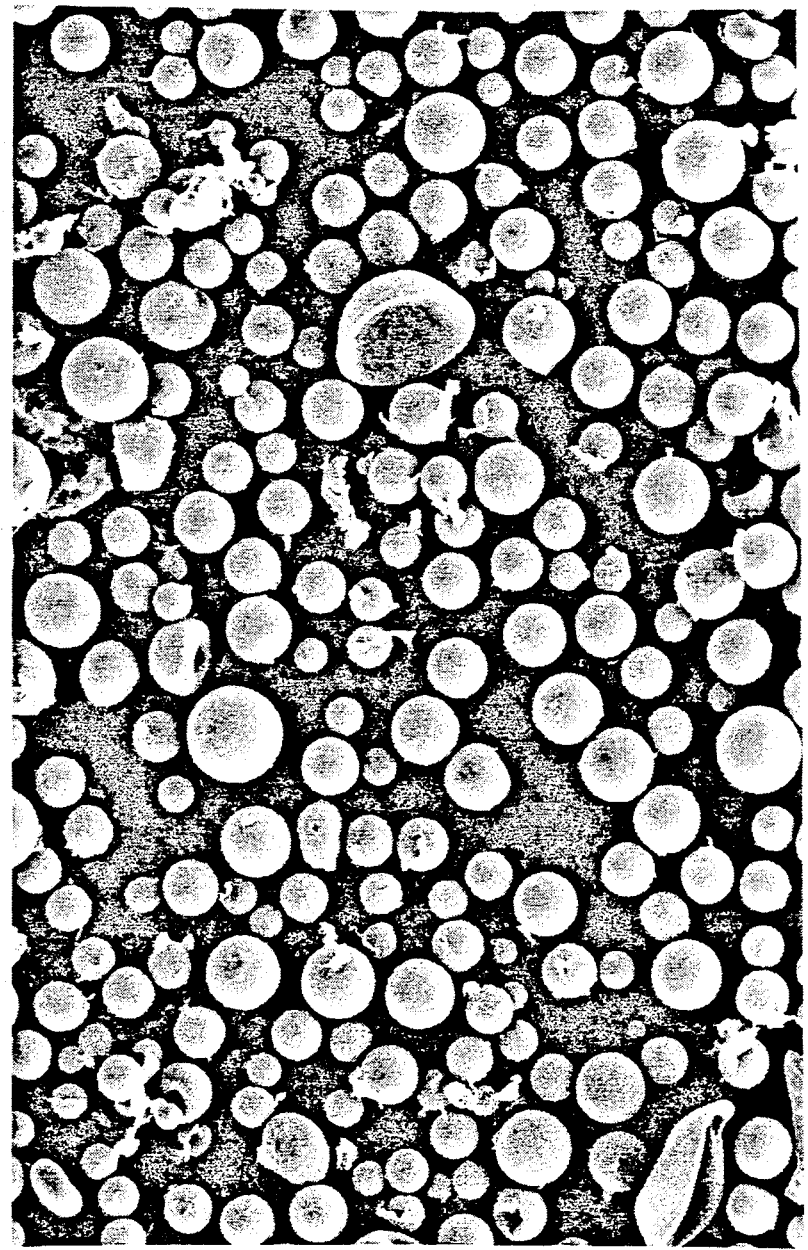
FIGS. 1, 2 and 3 are scanning electron micrographs of different magnification (100x, 800x and 2,000x respectively) of PHBV/vanillin particles where the hydroxyvalerate was present in an amount of about 14 wt. % of the copolymer.

In practicing the present invention, fat soluble flavors and PHAs, are admixed and added to low-fat or no-fat fat/cream-containing food products as a flavoring component. The resulting food products have the natural taste impression of their fatty counterparts. The flavor is then released in a more natural and familiar sequence and rate as the PHA/flavor composition is warmed by the mouth, thereby generating a more natural temporal flavor profile which is characteristic of the flavor profile of conventional high-fat foods. Water soluble flavor components, on the other hand, are readily released in low or non-fat foods for sensory perception resulting in the usual pattern of perception for such components since this process doesn't impede or perturb their pattern of release. Therefore, by employing the present flavor delivery compositions, the fat soluble flavor sensation of full fat foods is achieved without the incorporation of fat. The PHA can also be a copolymer of hydroxybutyrate and a $C_2$-$C_{12}$ alkanoate.

Any naturally harvested or synthetically produced PHA is acceptable in practicing the present invention. Suitable PHAs include PHB and P(HBcoHV). Suitable fat soluble flavors include vanilla extract, vanillin, starter distillates, lipolyzed oils, botanical extracts, natural and artificial fatty flavors. Mixtures of fat soluble flavors can also be employed in the practice of the present invention. Mixtures of different PHAs can also be employed. Preferred PHAs include those having a porous surface. The PHAs and fat soluble flavors can be combined in any manner. They can be physically mixed together employing standard mixing techniques. Preferably, the fat soluble flavors are mixed with soluble PHAs prior to precipitation of the PHA into a solid particle, sheet or film, thereby providing a flavor delivery composition comprising a uniform dispersion of fat flavor and PHA. Especially, preferred compositions are those where the PHA exhibits a porous shape which have fat flavors dispersed throughout the porous PHA.

The particle size distribution of PHAs can be controlled in a number of ways, including: (a) dissolving the PHA in a suitable polar organic solvent, such as methylene chloride, chloroform, dimethylsulfoxide (DMSO), dimethylformamide (DMF), etc., and then forcing the dissolved PHA through a spinerette, syringe, small diameter orifice, or other suitable device at a high speed (rate) in a continuous or intermittant manner to a non-solvent, (one in which the PHA is insoluble in) such as water, alcohol, or a non-polar organic solvent, etc., to cause precipitation of PHA; (b) dissolving the PHA in a suitable solvent, and then removing the solvent either by evaporation under high speed shear conditions, by spray drying, stirring or other suitable methods to cause precipitation of PHA granules; or (c) dissolving the PHA in a suitable solvent at elevated temperatures, and then preparing a PHA gel by reducing the temperature of the solution to ambient, and, if appropriate, then treating the thus obtained gel particles under high shear conditions in a homogenizer, blender, or other suitable device, to obtain the desired particle size. A suitable mixing apparatus is described in U.S. Pat. No. 4,828,396, which is incorporated herein by reference.

The physical characteristics of the PHA particle can be modified by adding detergents, surfactants, monoglycerides, phospholipids (lecithin), protein (gelatin) and gums to the PHA solutions and thereafter precipitating the PHA/flavor composition from solution. Generally, the above modifiers effect the porosity of the PHA/flavor composition.

It is preferred to increase the surface area of the PHA particles so that the flavors can be dispersed throughout the PHA composition. This provides a more natural delivery of the flavors in the low-fat/no-fat food.

The present PHA/flavor compositions are added as a flavor component to low-fat/no-fat foods in amounts which will vary depending on a variety of factors, such as, for example, the specific food, the particular flavor(s), the targeted consumer group and the like. The PHA/flavor compositions are added to other food ingredients during the food preparation process employing standard blending techniques.

In foods that are creamy in texture, it is preferred to employ porous PHA particles that have a shape and size distribution as disclosed in my copending application, Ser. No. 616,511, filed evendate herewith entitled POLYHYDROYXALKANOATE CREAM SUBSTITUTE which is incorporated herein by reference.

The following Examples illustrate the practice of the present invention, but should not be construed as limiting its scope.

EXAMPLE 1: POLY(HYDROXYBUTYRATE)/POLY(HYDROXYVALERATE) AS A FLAVOR CARRIER

Poly(hydroxybutyrate)/poly(hydroxyvalerate) (14% PHV) was added to methylene chloride at 6.67% w/v and refluxed until the polymer was completely dissolved (~30 minutes). Upon cooling the PHBV/CH$_2$Cl$_2$ solution, 1% w/v of vanillin was added and the mixture was stirred until clear. This solution was poured into 0.1M sodium phosphate, pH 7.4, containing 1% w/v gelatin, at a ratio of 1 part polymer/flavor solution to 50 parts aqueous buffer, while stirring at 600-650 RPM. After ~20 minutes, stirring was reduced to 550 RPM (due to foaming) and continued for 1.5 hours, in a hood, so that the methylene chloride evaporated. The "microspheres" were collected on a fritted funnel, washed with a copious amount of water and lyophilized.

Functionality as a flavor delivery system was measured in two Runs on a 10% w/v suspension of the PHBV/vanillin in water. The amount of free vanillin was measured by HPLC at 25° C. before warming the suspension to higher temperatures (37° C., 50° C. and 70° C.) and monitoring the vanillin concentration as a function of time. The vanillin measurements were carried out by injecting 100μl of supernatant onto a reversed phase C18 column (250 mm×4.6 mm) using 20:80 acetonitrile/water, at a flow rate of 1 ml/min, as the mobile phase. Detection was achieved by measuring the change in absorbance at 348 nm.

The amount of measurable vanillin increased significantly as the temperature was raised from 25° C. to 37° C., and more than when heated to 50° C. as illustrated in TABLES 1 and 2. Free vanillin decreased when the temperature was taken to 70° C.

TABLE 1

Vanillin Release Results From Incubation Run #1

| Incubation Temp. (°C.) | Incubation Time (min)* | Peak Area (μV.sec) |
|---|---|---|
| 25 | 2 | 1080 |
| 25 | 30 | 1376 |
| 25 | 45 | 1440 |
| 25 | 60 | 1580 |
| heated | | |
| 50 | 20 | 2752 |
| 50 | 40 | 3215 |
| 50 | 60 | 3263 |
| 50 | 2460 | 3796 |

*Time of incubation at that particular temperature.

TABLE 2

Vanillin Release Results From Incubation Run #2

| Incubation Temp. (°C.) | Incubation Time (min)* | Peak Area (μV.sec) |
|---|---|---|
| 25 | 2 | 386 |
| 25 | 20 | 668 |
| 25 | 40 | 755 |
| 25 | 60 | 790 |
| heated | | |
| 37 | 20 | 1126 |
| 37 | 45 | 1449 |
| 37 | 60 | 1611 |
| 37 | 1005 | 2135 |
| 50 | 30 | 2758 |
| 50 | 60 | 2791 |
| 50 | 120 | 3107 |
| 70 | 30 | 2544 |
| 70 | 60 | 1671 |

*Time of incubation at that particular temperature.

As can be seen from the results, the amount of free vanillin (vanillin in solution) increased significantly as the temperature was increased to as high as 50° C.

Figure 2:
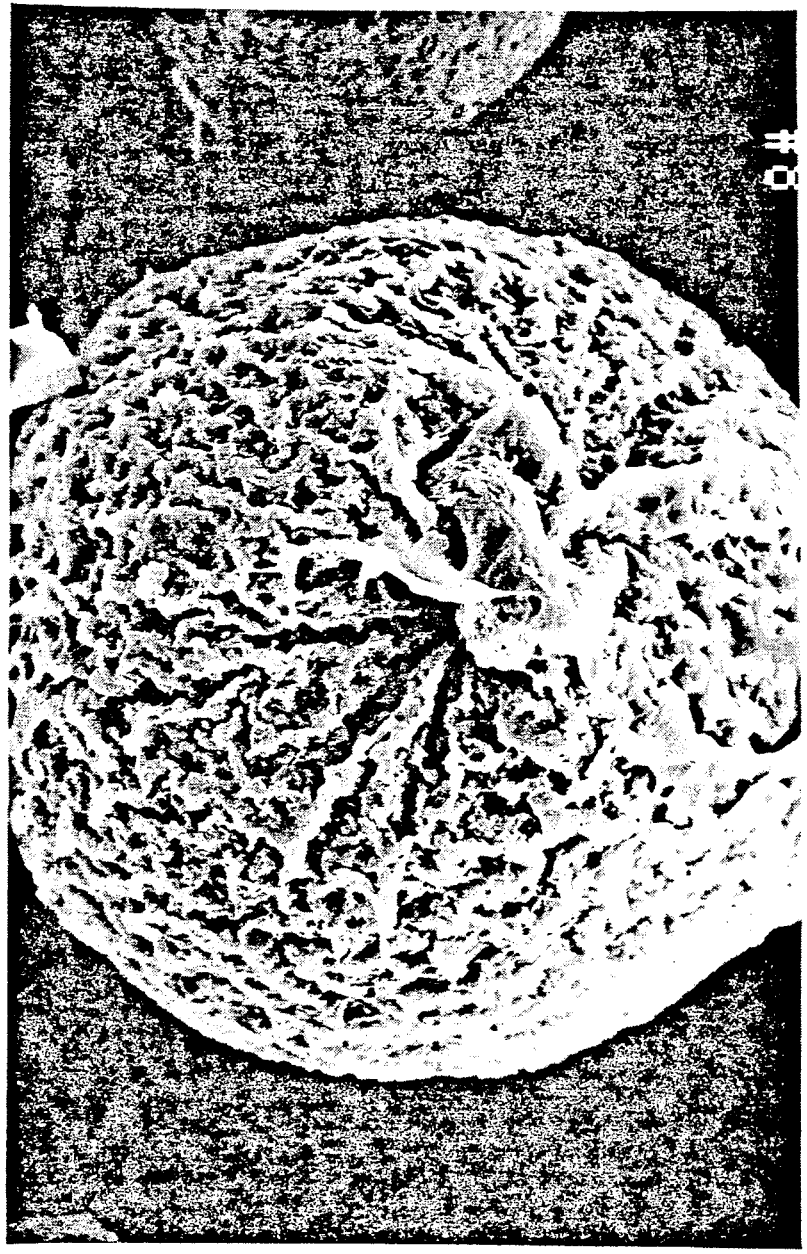
Figure 3:
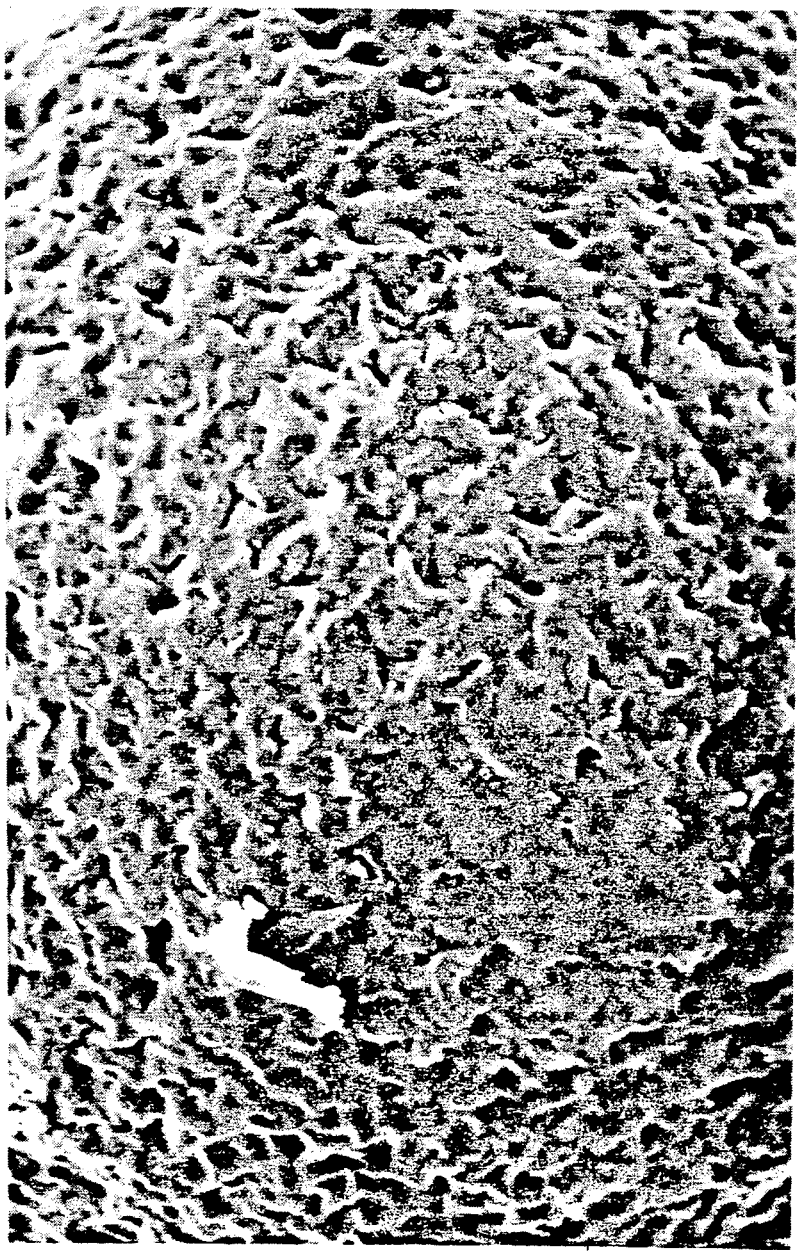

Scanning electron micrographs of the PHBV/vanillin flavor composition show that the particles appear to have a very porous surface structure. The particles range in size from 15.4 to 126.9 microns as seen in FIGS. 1, 2 and 3.

EXAMPLE 2

PHBV/vanillin microspheres were prepared as described in EXAMPLE 1, with the exception that 2% w/v vanillin was added to the 6.67% w/v PHBV/CH$_2$Cl$_2$ solution. Also, the PHBV/vanillin solution was added to the aqueous buffer at a ratio of 1:13.3. All other steps for the preparation of the microspheres were identical.

Flavor delivery was evaluated, as described in EXAMPLE 1, on a 5% w/v suspension of the PHBV/vanillin in four systems, i.e. (i) water; (ii) a full-fat frozen dessert mix; (iii) a low-fat frozen dessert mix containing a microparticulated protein fat substitute as disclosed in allowed, co-pending U.S. patent application Ser. No. 246,421, filed Sep. 19, 1988, which is incorporated herein by reference; and (iv) a frozen dessert mix negative control containing no fat or fat substitute ingredient. The vanillin measurements were carried out by centrifuging aliquots of the respective mixes, diluting the supernatants at 1:1 with a solution of 70:30 acetonitrile/water, then centrifuging and injecting 100 ul aliquots of the supernatents onto the HPLC system described above.

From the results listed in Tables 3-6, it is evident that the amount of free vanillin increased significantly in all four systems as the samples were warmed from 5° C. to 37° C.

TABLE 3

Vanillin Release Results From Incubation of PHBV/vanillin in Water

| Incubation Temp. (°C.) | Incubation Time (min)* | Peak Area (μV.sec) |
|---|---|---|
| 5 | 40 | 1814 |
| 5 | 60 | 2016 |
| 5 | 90 | 2247 |
| heated | | |
| 37 | 30 | 3771 |
| 37 | 60 | 6466 |
| 37 | 90 | 7330 |

*Time of incubation at that particular temperature.

TABLE 4

Vanillin Release Results From Incubation of PHBV/vanillin in Full Fat Frozen Dessert Mix

| Incubation Temp. (°C.) | Incubation Time (min)* | Peak Area (μV.sec) |
|---|---|---|
| 5 | 20 | 2158 |
| 5 | 40 | 1663 |
| 5 | 60 | 3061 |
| 5 | 90 | 1460 |

TABLE 4-continued

Vanillin Release Results From Incubation of
PHBV/vanillin in
Full Fat Frozen Dessert Mix

| Incubation Temp. (°C.) | Incubation Time (min)* | Peak Area (μV.sec) |
|---|---|---|
| 5 | 120 | 1971 |
| heated | | |
| 37 | 30 | 6053 |
| 37 | 60 | 5570 |
| 37 | 90 | 6537 |

*Time of incubation at that particular temperature.

TABLE 5

Vanillin Release Results From Incubation of
PHBV/vanillin in Frozen Dessert
Mix Containing Microparticulated
Protein fat substitute

| Incubation Temp. (°C.) | Incubation Time (min)* | Peak Area (μV.sec) |
|---|---|---|
| 5 | 20 | 1632 |
| 5 | 40 | 720 |
| 5 | 60 | 1081 |
| 5 | 120 | 1692 |
| heated | | |
| 37 | 30 | 6952 |
| 37 | 90 | 10112 |
| 37 | 240 | 10810 |

*Time of incubation at that particular temperature.

TABLE 6

Vanillin Release Results From Incubation of
PHBV/vanillin in No Fat/No Fat
Substitute Frozen Dessert Mix

| Incubation Temp. (°C.) | Incubation Time (min)* | Peak Area (μV.sec) |
|---|---|---|
| 5 | 20 | 1107 |
| 5 | 40 | 1844 |
| 5 | 60 | 1158 |
| 5 | 90 | 1532 |
| heated | | |
| 37 | 30 | 2128 |
| 37 | 60 | 5091 |
| 37 | 90 | 5630 |

*Time of incubation at that particular temperature.

It should be noted, that Frozen Dessert mix which contained microparticulated protein fat substitute was injected onto the HPLC system after diluting 1:1 with a solution of 70:30 acetonitrile/water and centrifuging. The peak areas for duplicate runs were 4902 and 3792 uV°sec respectively. See Juni, Nakano and Kubota, "Journal of Controlled Release", 4 (1986) 25-32

In similar embodiments the various PHA compositions described herein are combined with fat flavors to provide a flavor delivery system for low-fat and no-fat foods.

Additionally the present PHA compositions can be combined with colors, natural or artificial, to stabilize the release of color and provide heat stability to heat sensitive colors.

What is claimed is:

1. A method for the delivery of fat soluble flavor compounds into nonfat and low-fat food products in which fat components have been replaced by non-lipid fat substitutes comprising the step of introducing into said food products a flavor delivery composition comprising (a) fat flavors and
(b) a polyhydroxyalkanoate of the formula

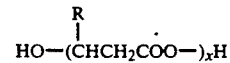

wherein R represents a $C_1$–$C_{12}$ alkyl which can be the same or different on each repeating monomeric unit and x represents an interger of from 500–17,000.

2. The method of claim 1 wherein the PHA is a homopolymer.

3. The method of claim 2 wherein R is methyl.

4. The method of claim 1 wherein the PHA is a copolymer of hydroxybutyrate and hydroxyvalerate.

5. The method of claim 1 wherein the PHA is a copolymer or terpolymer.

6. The method of claim 1 wherein the PHA is a copolymer of hydroxybutyrate and a $C_2$–$C_{12}$ alkonoate.

7. The method of claim 1 wherein said flavor compounds are selected from the group consisting of vanilla extract, vanillin, starter distillates, lipolyzed oils, botanical extracts, natural and artificial fatty flavors.

8. In a food product containing a fat and/or cream, the improvement which comprises adding to food product a flavor delivery system which comprises:

(a) fat soluble flavors
(b) PHA particles of the formula

wherein R represents a $C_1$–$C_{12}$ alkyl which can be the same or different on each repeating monomeric unit and x represents an interger of from 500–17,000.

9. The improved food product of claim 8 which is selected from the group consisting of ice cream, yogurt, mayonnaise, cheese, milk, an icing, a spread, sour cream, coffee whitener, whipped topping, cream, and a sauce.

10. The improved food product of claim 9 which is ice cream.

11. The improved food product of claim 8 which is salad dressing.

12. The improved food product of claim 8 wherein the PHA is a homopolymer.

13. The improved food product of claim 8 wherein R is methyl.

14. The improved food product of claim 8 wherein the PHA is a copolymer of hydroxybutyrate and hydroxyvalerate.

15. The improved food product of claim 8 wherein the PHA is a copolymer or terpolymer.

16. The improved food product of claim 8 wherein the PHA is a copolymer of hydroxybutyrate and a $C_2$–$C_{12}$.

17. The improved food product of claim 8 which is cream cheese.

* * * * *